(No Model.)
L. K. CURLETT.
APPARATUS FOR HEATING RAILROAD CARS.
No. 374,659. Patented Dec. 13, 1887.
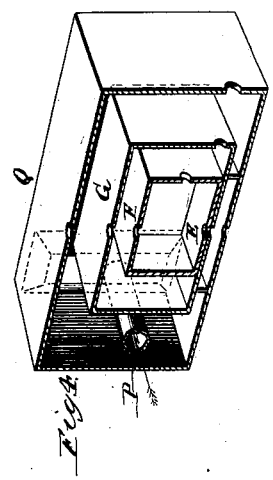
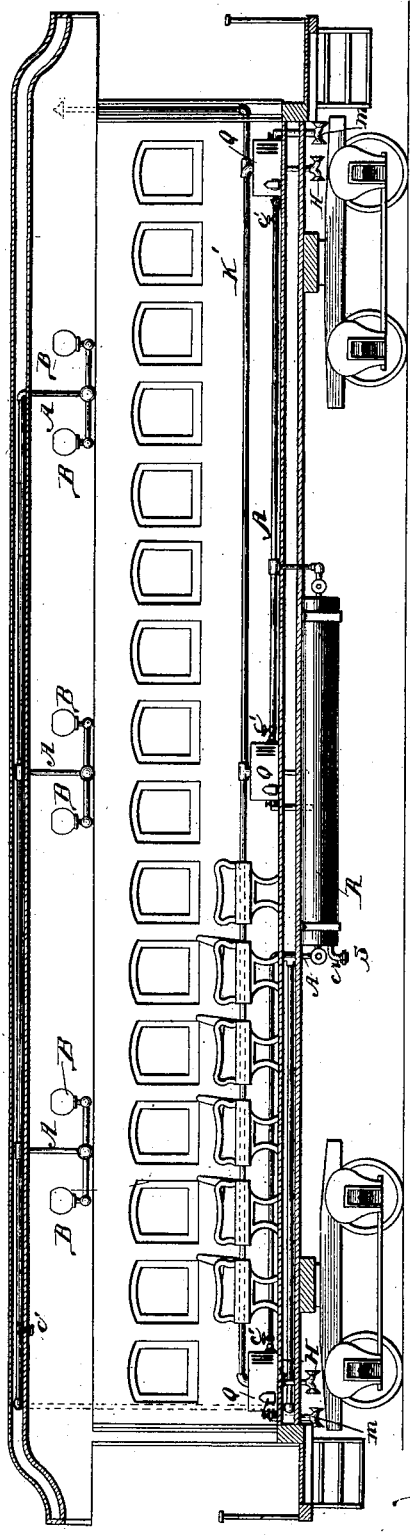
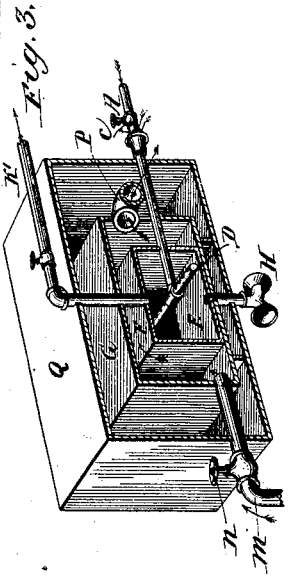
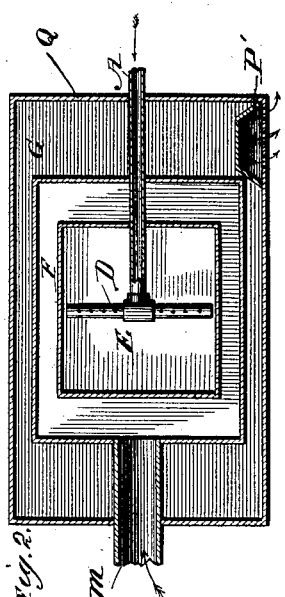

United States Patent Office.

LEWIS K. CURLETT, OF CHICAGO, ILLINOIS, ASSIGNOR TO HARRY W. HOLMES, OF SAME PLACE.

APPARATUS FOR HEATING RAILROAD-CARS.

SPECIFICATION forming part of Letters Patent No. 374,659, dated December 13, 1887.

Application filed July 11, 1887. Serial No. 244,043. (No model.)

*To all whom it may concern:*

Be it known that I, LEWIS K. CURLETT, of Chicago, in the county of Cook and State of Illinois, have invented a new and useful Improvement in Apparatus for Heating and Lighting Railroad and other Cars and Vehicles with Gas, which invention is fully set forth in the following specification, reference being had to the accompanying drawings.

The object of my invention is to provide an apparatus for lighting and heating vehicles with gas, by which the gas may be burned to the best advantage for the production of light and heat as required, and still be fully under control at all times.

Referring to the drawings, Figure 1 is a car equipped with my improved apparatus. Fig. 2 is a top sectional view of the heater. Figs. 3 and 4 are side sectional views of the heater with the front thereof removed.

Similar letters denote similar parts throughout the drawings.

R is a reservoir, into which the gas is introduced through the supply-pipe S from a reservoir or apparatus of any kind arranged to charge the reservoir with gas at the desired pressure.

C is a valve or stop-cock by which the pipe S is closed after R is fully charged with gas.

A A are pipes leading from the reservoir R to the lighting and heating burners, and c' c' c' c' are valves or stop-cocks to regulate the supply of gas to the burners.

B B B B B B are lighting-burners of the usual pattern, and may be placed wherever convenient in the vehicle.

The heaters are constructed of metal, and comprise an outer cold-air box or protecting-case, Q, and a casing, G, within it, which in turn incloses the fire-box F, having the combustion-chamber E. The combustion-chamber E is supplied with gas-burners either in the form of a perforated pipe, D, as shown, attached to and supplied through the pipe A, or with the "Bunsen" burners, so called, supplied with air spaces in the burner itself.

To supply air to the combustion-chamber it is provided with a supply-pipe, H, having a double funnel on its lower end to facilitate the introduction of air whichever way the vehicle may be moving, and is also provided with the pipe K', to carry off the smoke and combustion product and to furnish a draft of air through the combustion-chambers. The hot-air chamber or casing F is provided with an inlet-pipe, M, also provided with a double funnel at its bottom. The cold air admitted through M circulates in the box F over and about the combustion-chamber E, becoming heated to a degree proportionate to the heat generated in the combustion-chamber E, and then leaves the chamber or casing F through the pipe or orifice P to the register P', through which it is admitted to the vehicle or apartment to be heated, and by which the heat is regulated. The outer case, Q, serves to prevent the radiation and loss of heat which would pass off from the outside of the chamber F were it not for the outer box or case, Q.

Having thus described my invention, what I claim, and desire to secure by Letters Patent, is—

A heater for cars and other vehicles, comprising a casing, F, forming a combustion-chamber, E, a burner, D, in said chamber, a casing, G, surrounding the casing F and forming an air-heating space, a casing, Q, having a register, P', and forming a dead-air space around the casings F and G, and pipes M and P for air leading through the dead-air space to and from the air-heating chamber, the latter communicating with the register P' in the casing Q, substantially as shown and described, and for the purposes specified.

LEWIS K. CURLETT.

Witnesses:
 WILLIAM H. SISSON,
 C. F. GOODING.